(12) United States Patent
Livano

(10) Patent No.: US 11,722,871 B2
(45) Date of Patent: Aug. 8, 2023

(54) BLUETOOTH INTERCOM ACCESSORY FOR HELMETS

(71) Applicant: Anthony Livano, Newport Beach, CA (US)

(72) Inventor: Anthony Livano, Newport Beach, CA (US)

( * ) Notice: Subject to any disclaimer, the term of this patent is extended or adjusted under 35 U.S.C. 154(b) by 66 days.

(21) Appl. No.: 17/032,584

(22) Filed: Sep. 25, 2020

(65) Prior Publication Data

US 2021/0112391 A1 Apr. 15, 2021

Related U.S. Application Data

(60) Provisional application No. 62/905,960, filed on Sep. 25, 2019.

(51) Int. Cl.
| | |
|---|---|
| *H04W 4/80* | (2018.01) |
| *H04R 1/02* | (2006.01) |
| *H04R 1/08* | (2006.01) |
| *A42B 3/04* | (2006.01) |
| *A42B 3/30* | (2006.01) |

(52) U.S. Cl.
CPC .............. *H04W 4/80* (2018.02); *A42B 3/044* (2013.01); *A42B 3/303* (2013.01); *A42B 3/306* (2013.01); *H04R 1/025* (2013.01); *H04R 1/08* (2013.01); *H04R 2420/07* (2013.01)

(58) Field of Classification Search
CPC .......... H04W 4/80; A42B 3/044; A42B 3/303; A42B 3/306; A42B 3/30; H04R 1/025; H04R 1/08; H04R 2420/07; H04R 1/028

USPC ......................................................... 455/41.2
See application file for complete search history.

(56) References Cited

U.S. PATENT DOCUMENTS

| | | | |
|---|---|---|---|
| 2006/0262194 A1* | 11/2006 | Swain .................... | H04N 5/2251 348/E5.025 |
| 2010/0171695 A1* | 7/2010 | Yamamoto ............. | G06F 3/0346 345/157 |
| 2011/0188236 A1* | 8/2011 | Eichelberger .............. | F21L 4/00 362/191 |
| 2012/0077438 A1* | 3/2012 | Jung ..................... | H04R 1/1066 455/41.2 |
| 2014/0105441 A1* | 4/2014 | Kroupa ................. | H04R 1/1033 381/370 |
| 2014/0218962 A1* | 8/2014 | Waters .................. | A42B 1/0182 362/570 |
| 2021/0045485 A1* | 2/2021 | Shoulders ................ | A42B 3/04 |

* cited by examiner

*Primary Examiner* — Eugene Yun
(74) *Attorney, Agent, or Firm* — Handal & Morofsky LLC; Anthony H. Handal

(57) ABSTRACT

A wireless communications and light emitting diode (LED) device compatible with conventional helmet structures and adapted, while the helmet is being worn, to effectively illuminate likely illumination targets with an internal lighting device. More particularly, the accessories and applications according to various embodiments of the present invention make use of wireless communication and lighting devices to provide advantages in helmet use, with the ability to answer phone calls, communicate between rider-to-rider or rider-to-passenger, intercom talk hands free, ability to listen to music or voice instructions from GPS navigation, and noise cancelation, for safety, and convenience for the end user.

20 Claims, 9 Drawing Sheets

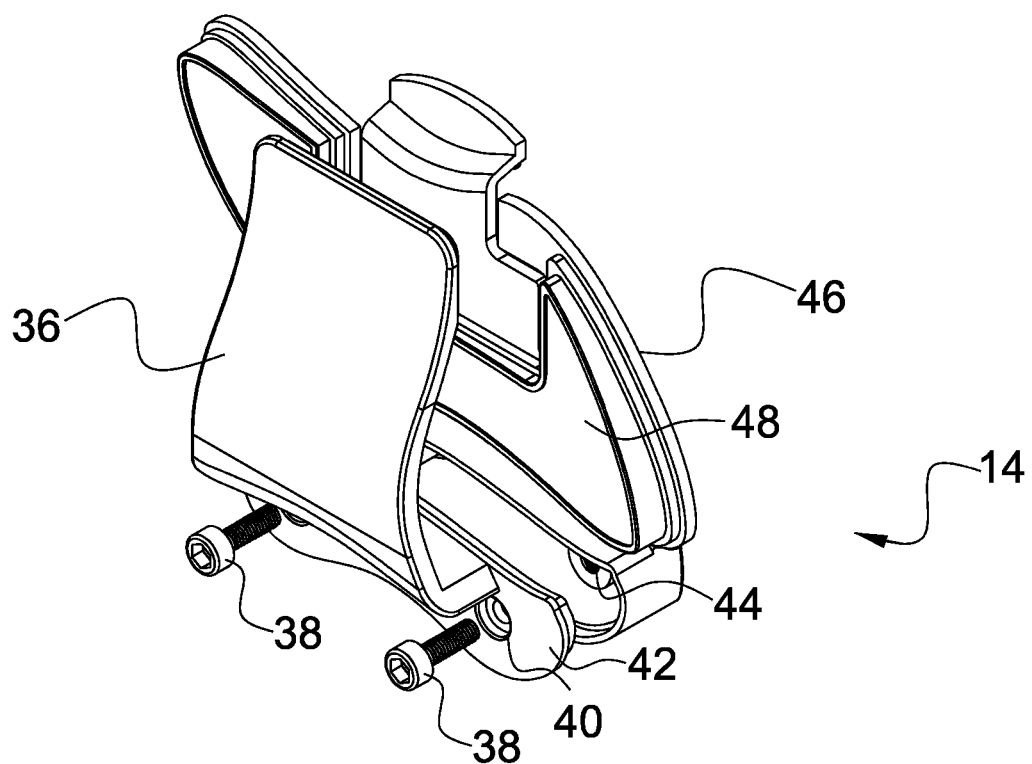

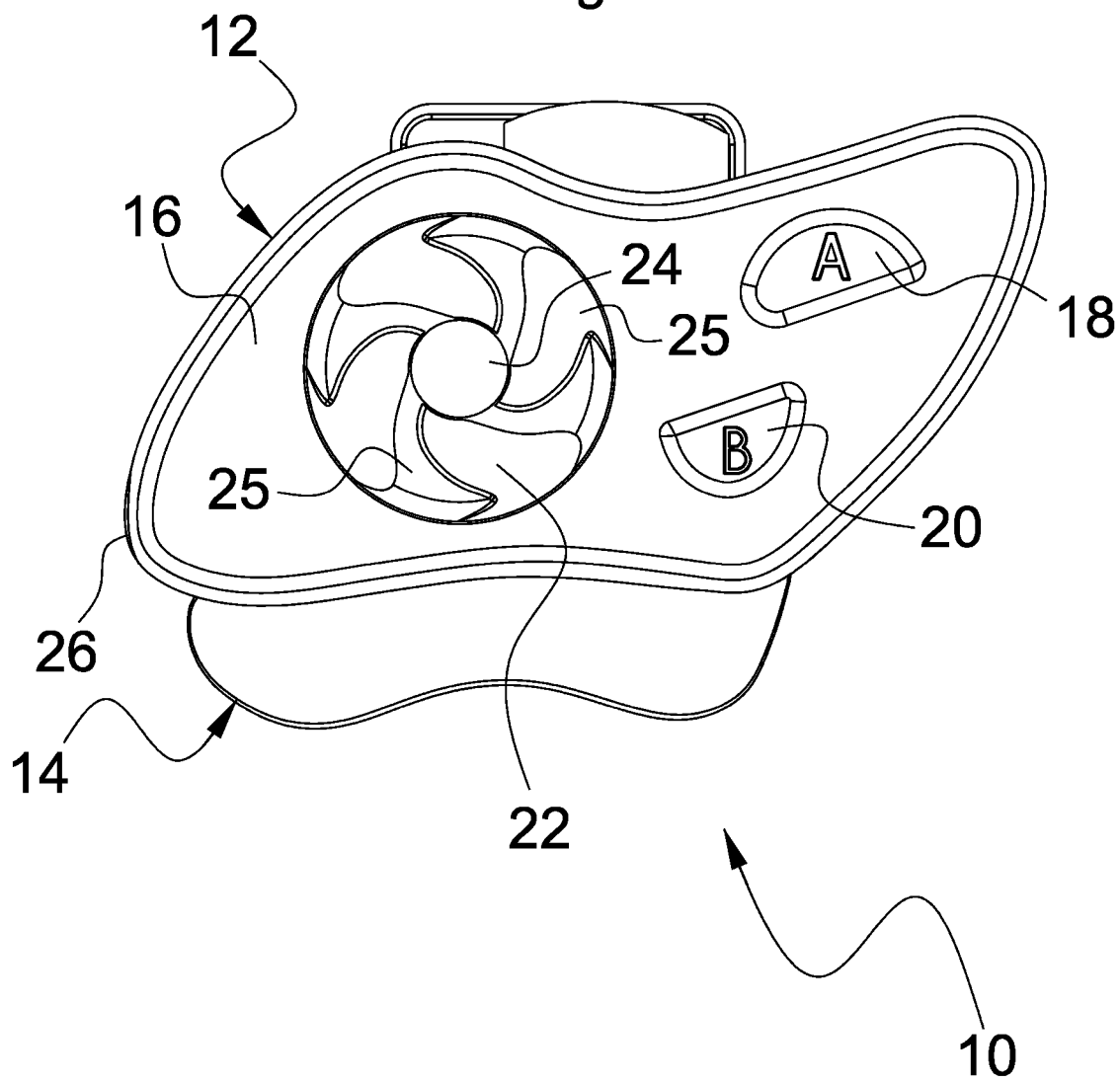

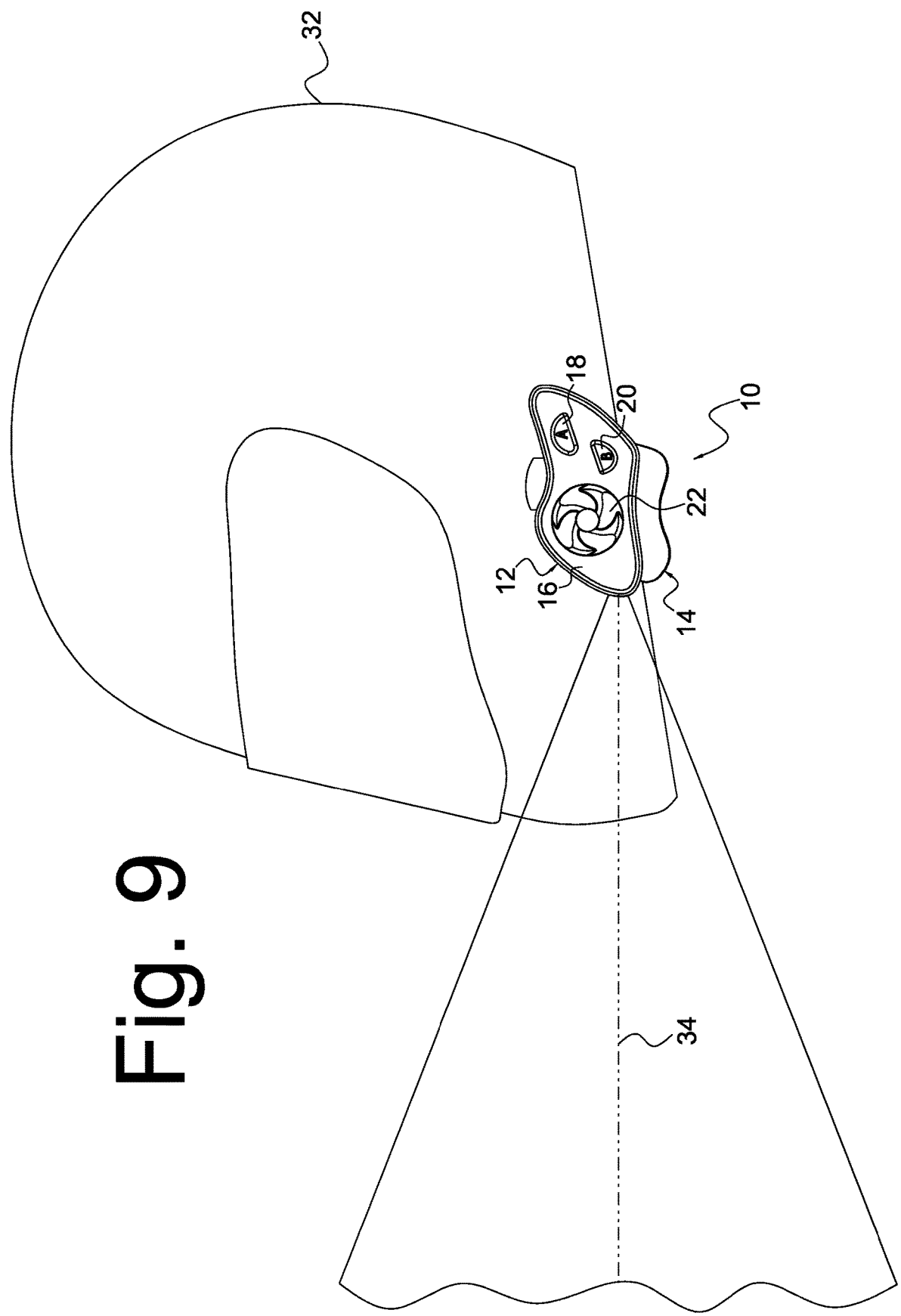

BLUETOOTH INTERCOM ACCESSORY FOR HELMETS

CROSS REFERENCE TO RELATED APPLICATIONS

This application claims the benefit of Provisional Patent Application No. 62/905,960, filed Sep. 25, 2019, the disclosure of which is hereby incorporated herein by reference thereto.

TECHNICAL FIELD

The present invention is directed generally to a wireless communications and light emitting diode (LED) compatible with conventional helmet structures and adapted, while helmet is being worn, to effectively illuminate likely illumination targets with an internal lighting device.

BACKGROUND OF THE INVENTION

Helmets and protective headgear are important measures for the safety of bikers and have the primary function of protecting the user's head from injury. Motorcycle helmets in particular are made to have a tight fit, not leaving space for much movement or additional implements.

While operating a vehicle, it is a common practice to listen to music or communicate with others, however for a biker, doing so has been difficult and particularly unsafe. Even if there was space for a headset or headphones within a helmet, for safety purposes it is important for a biker to be able to hear their surroundings, so a prudent biker would not want to have anything in their ears while on the road. In fact, even using headphones in an automobile is highly discouraged and illegal in some states for the same reason. This safety precaution is substantially more important for motorcyclists as they do not have the protection afforded by the steal body of an automobile surrounding them, protecting against injury.

Additionally, when riding with others, it is difficult to communicate even when in close proximity to each other due to the noise emitting from the vehicle and the distance required for safe travel. Communicating the intended course of travel, progress, and potential obstacles is pivotal to safety when traveling with others in this manner. For instance, a rider that is farther ahead would want to communicate with and forewarn the other riders of any obstacles or obstructions in the groups path to ensure the safety of the other riders.

Therefore, there is a need for a device that allows for a helmet user to be able to communicate, or have a general audio output, without obstructing their ability to hear their surroundings.

SUMMARY OF THE INVENTION

In accordance with the invention, a wireless communications and light emitting diode (LED) device compatible with conventional helmet structures and adapted, while the helmet is being worn, to effectively illuminate likely illumination targets with an internal lighting device. More particularly, the accessories and applications according to various embodiments of the present invention make use of wireless communication and lighting devices to provide advantages in helmet use, with the ability to answer phone calls, communicate between rider-to-rider or rider-to-passenger, intercom talk hands free, ability to listen to music or voice instructions from GPS navigation, and noise cancelation, for safety, and convenience for the end user.

BRIEF DESCRIPTION OF THE DRAWINGS

The operation of the inventive apparatus will become apparent from the following description taken in conjunction with the drawings, in which:

FIG. 7 is a left rear isometric view of the mounting clip;

FIG. 8 is a front view of the wireless intercom system attached to the mounting clip; and FIG. 9 is a front view of the wireless intercom system attached to the motorcycle helmet.

DETAILED DESCRIPTION OF THE PREFERRED EMBODIMENTS

Figure 1:
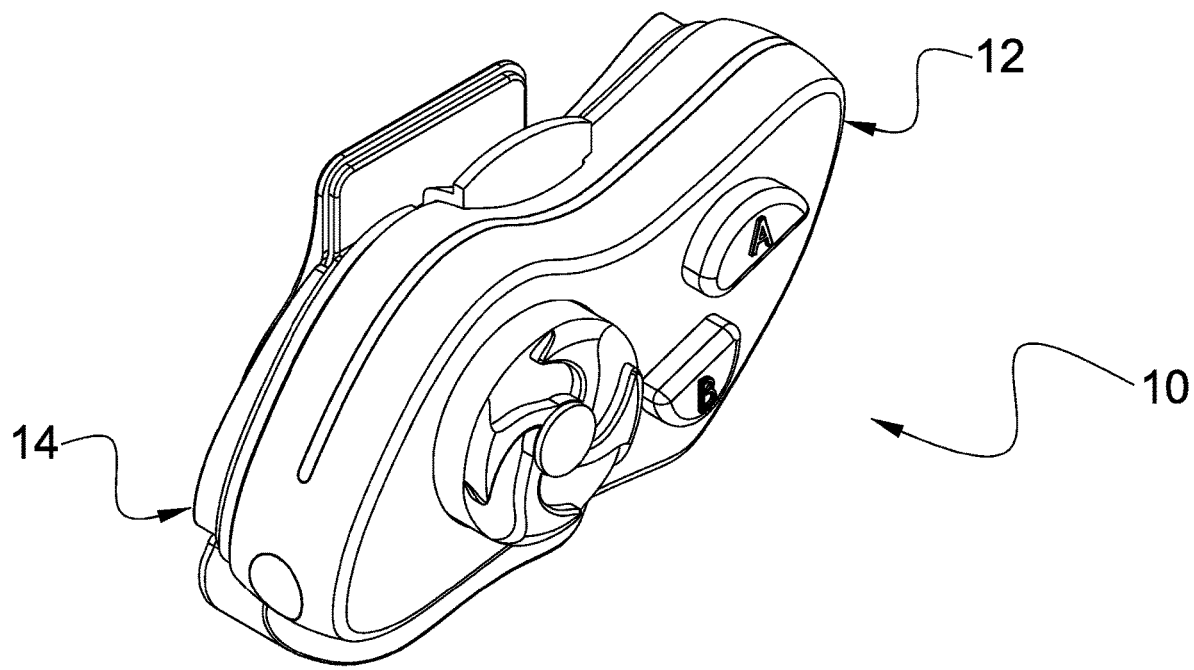
FIG. 1 is a left isometric view illustrating an exemplary wireless intercom device comprising a wireless intercom with a light source and mounting clip.

Referring to FIGS. 1-9, the structure and operation of the inventive wireless intercom accessory device 10 may be understood. Generally, accessory 10 is a Bluetooth communications device which may be used, for example, as one device in a set of two or more. In accordance with the invention, it is contemplated that these devices will be used by a plurality of motorcycle riders for the purpose of maintaining communication, promoting safety and exchanging information related to, for example but not limited to, their intended course of travel, progress, potential obstacles, among other potential communications.

Each of the devices is associated with and secured to a different helmet. Each of the helmets is worn by a respective rider. The inventive device may be used for the riders to communicate with each other by a Bluetooth connection. In addition, the inventive device 10 may be paired with a cellular telephone, smart phone, or other communication device enabling the same to switch over to act as a headset in cooperation with a microphone mounted on the helmet. More critically, it is contemplated that the inventive device will mate with existing connectors on the helmet which allow coupling to a speaker or headphone mounted in or on the helmet and a microphone also mounted in or on the helmet. More particularly, the inventive accessory 10 can connect with the microphone in or on the helmet by a standard microphone connector on the housing of the inventive accessory 10. Likewise, earphones in the helmet can connect to a standard earphone connector on the housing of the inventive accessory.

Wireless intercom accessory 10 comprises wireless intercom module 12 and a mounting clip 14. Wireless intercom 12 is attached to mounting clip 14 in the manner detailed below in connection with the description of FIG. 6.

Figure 2:
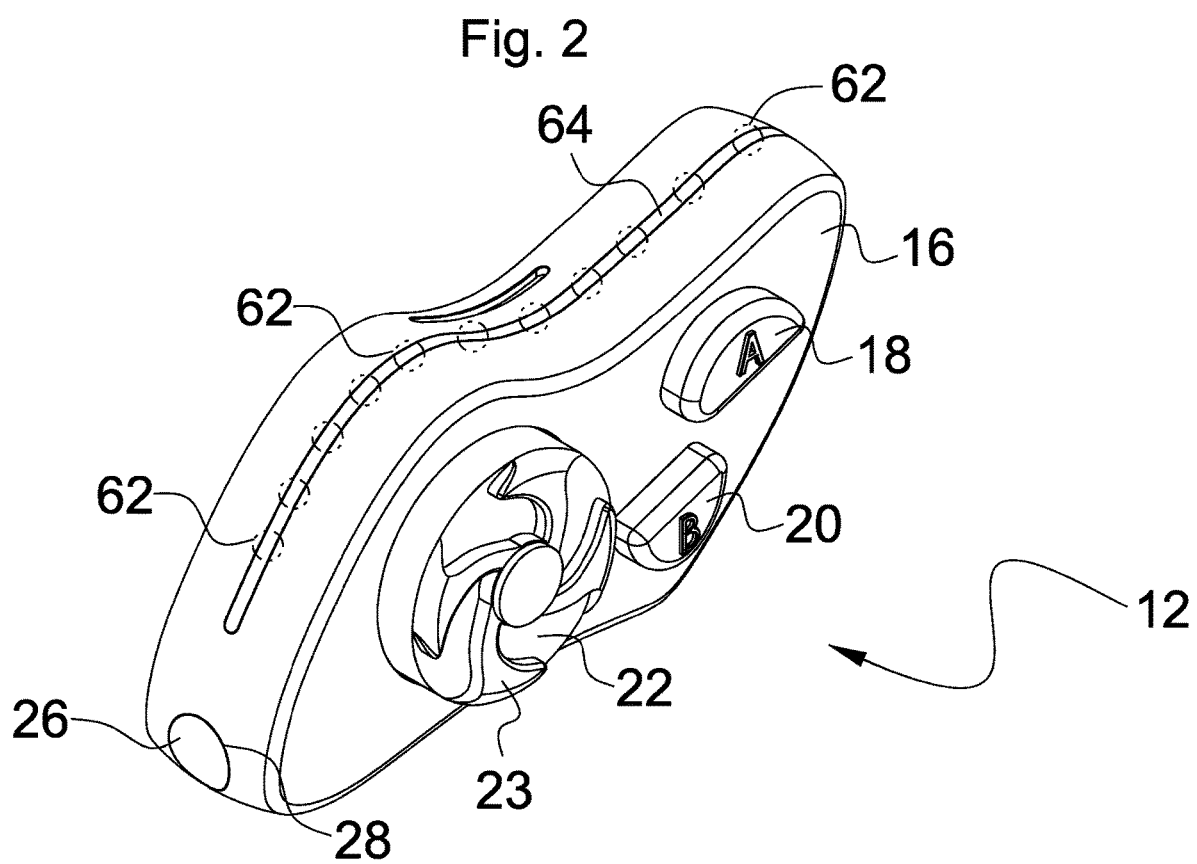
FIG. 2 is a left isometric view of the wireless intercom portion without the clip.

The shape of the separate wireless intercom 12 is better seen in FIG. 2, where a left isometric view of wireless intercom 12 itself, without clip 14, is illustrated. Wireless intercom 12 defines a substantially flat side surface 16. Buttons 18 and 20 are positioned on the surface 16. Buttons 18 and 20 are capable of being actuated by push release and push hold types of movement by the operator.

By "push release" movement, is meant the operation of the button by the user pushing the button and immediately releasing it. By "push hold" movement, is meant the movement of the finger of the operator of the device pushing the button down and holding it in the depressed position for a period of time dictated by the electronic circuitry in the system, for example three seconds. The electronic system senses that the button is down for a short time or long time and interprets the time as different commands to achieve different objectives, and in a manner well known in the art.

Rotary button 22 includes a rotatable outer rim with recesses 23 defined between protrusions 25. Recesses 23 can be engaged by the finger of the user, allowing the user to easily rotate button 22 by providing positive engagement which may be easily tactilely set by the user, which is of particular value in the context of a user who may be operating a motorcycle while operating the inventive device 10. In accordance with the invention, as will be detailed below, it is contemplated that Rotary button 22 will be rotated to achieve control over the volume of the Bluetooth system. At the same time, rotary button 22 may be operated by being pushed and released, or pushed and held. Each button cooperates with internal electronic circuitry, which can be configured to enable the buttons to perform two or more commands for the purpose of reducing the number of buttons. The same is achieved by multiple pressing of single buttons, simultaneous pressing and holding of multiple buttons and the like. For example, combinations of buttons are coupled to circuitry configured to perform different commands and capable of sensing, for example, push and release, and push and hold movements.

More particularly, and in accordance with the preferred embodiment, for example, when button 18 and rotary button 22 are pushed and held for three seconds, wireless intercom 12 will turn on. It can also be turned off with the same movements. Depending on how long a button or combinations of buttons are held after being pushed or how many times they are pushed and released, different commands are performed.

The shape of buttons 18 and 20, and rotary button 22 is best seen in FIG. 8. Buttons 18 and 20 are, optionally, made of material with high friction such as rubber to provide a gripping effect and prevent slipping when they are pushed and released, or pushed and held. Button 22 is made of plastic and is, optionally but preferably, substantially larger than button 18 and button 20. Rotary button 22 comprises a relatively small central flat circular member 24, optionally, made of a material with a high friction such as rubber. However, because of the size of rotary button 22, having a high friction surface, such as that provided by rubber, is not critical. If desired, rotary button 22, including flat circular member 24, may be injection molded as a single part.

The relatively small size of flat circular member 24 prevents slipping of fingers when rotary button 22 is pushed and when rotary button is pushed and held. As noted above, rotary button 22 defines recess 23 between protrusions 25 made of plastic and configured to provide more grip when rotary button 22 is rotated. In addition, the shape and location of the buttons 18 and 20, and rotary button 22 allows user to differentiate them only by touching them. Protrusions 25 have a shape which tapers from wide at the circumference of button 22 to being relatively narrow closer to the center of button 22, providing particularly effective tactile signals to the user.

Figure 3:
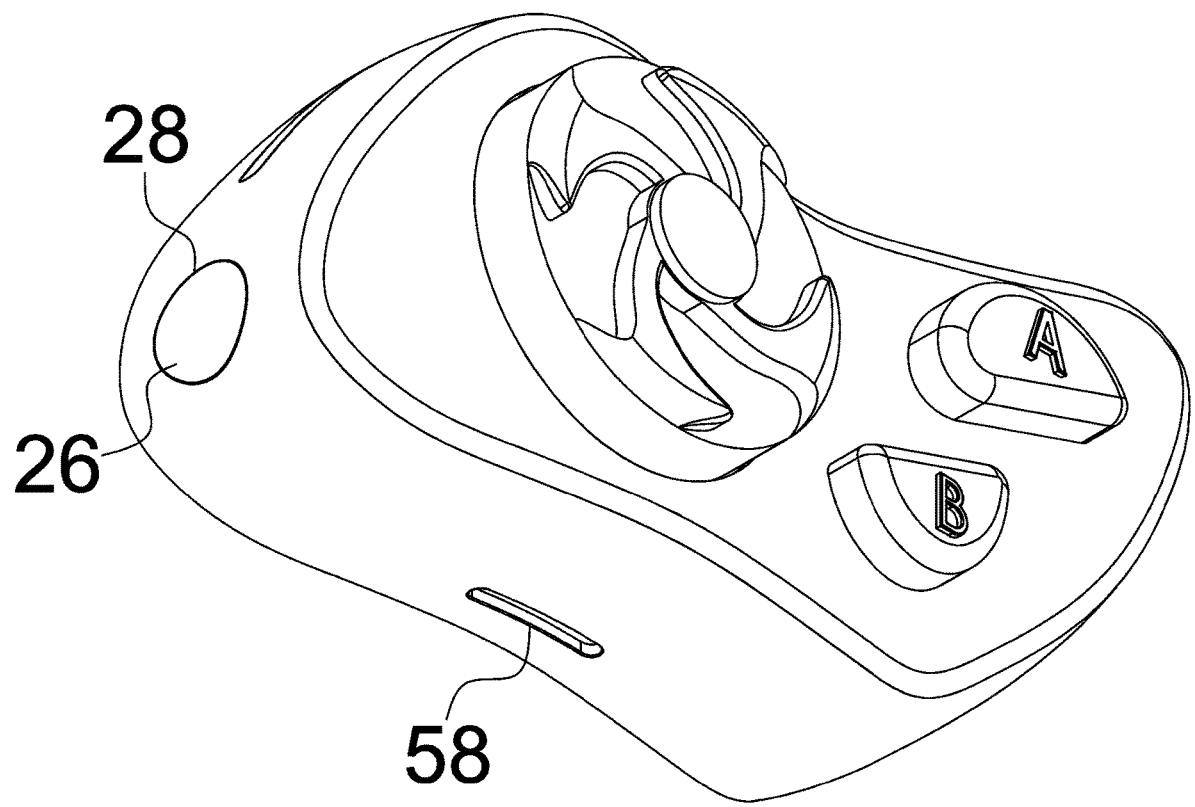
FIG. 3 is a lower left isometric view of the wireless intercom.
Figure 4:
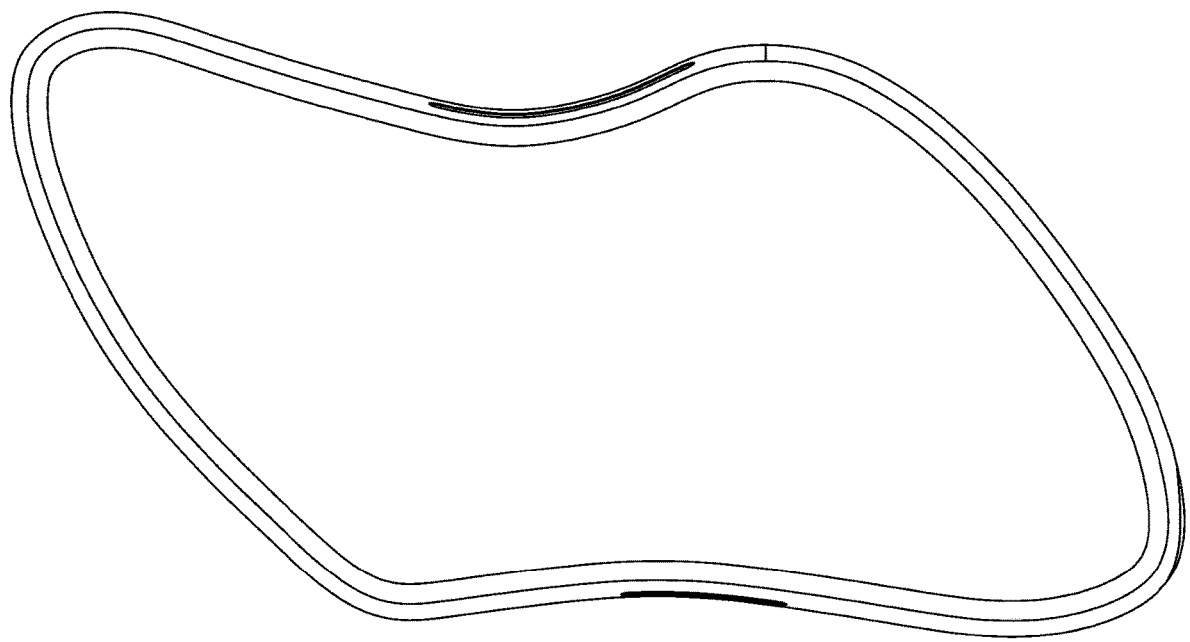
FIG. 4 is a bottom view of the wireless intercom.
Figure 5:
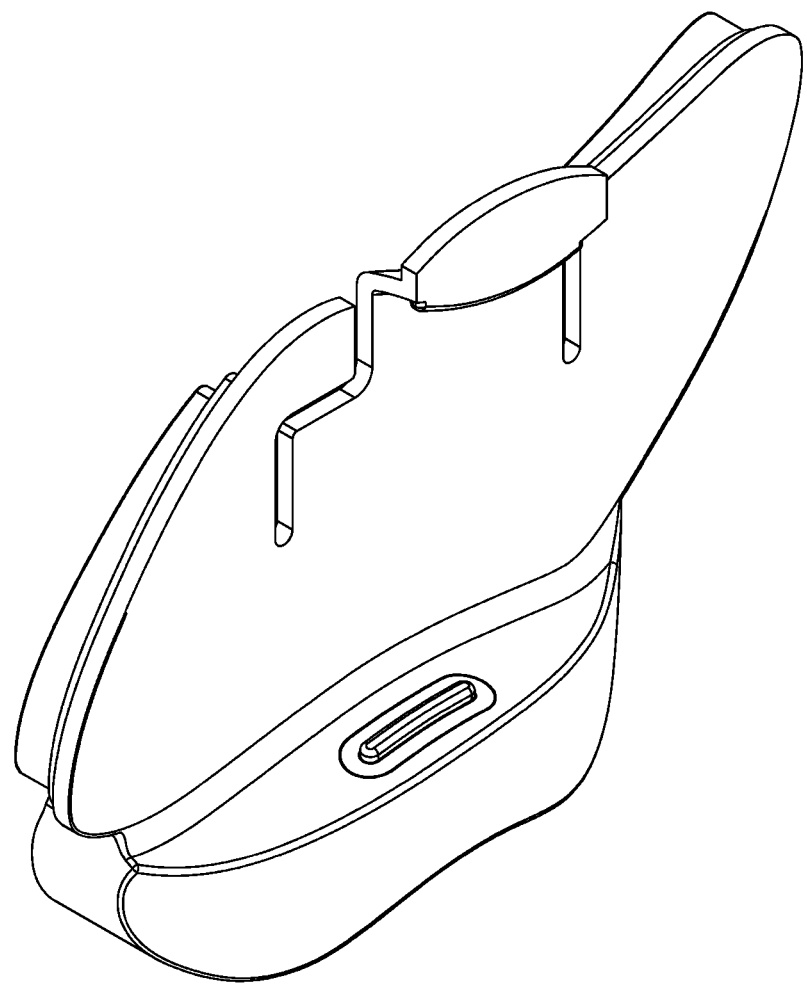
FIG. 5 is a left isometric view of the mounting clip.
Figure 6:
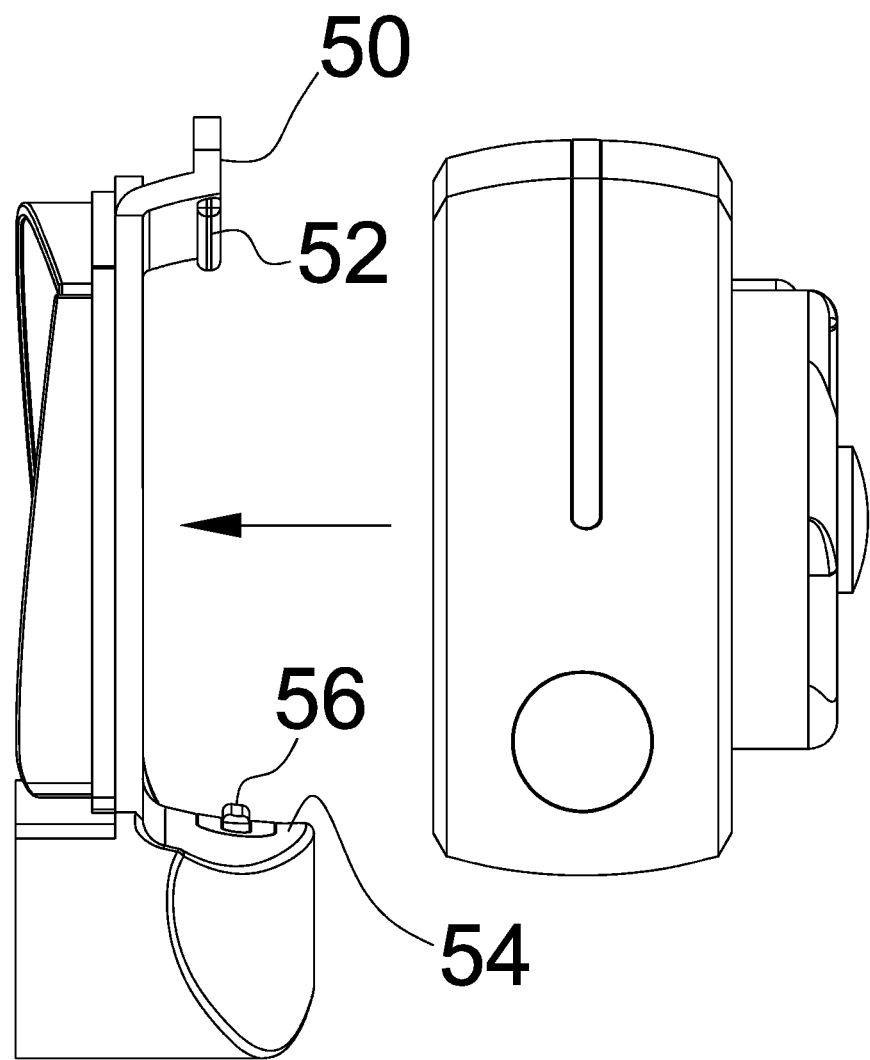
FIG. 6 is a left view of the mounting clip and wireless intercom separated by distance.

In accordance with the invention, as illustrated in FIGS. 2 and 3, the inventive accessory includes a light-emitting assembly 26. Assembly 26 comprises a light-emitting diode powered by a battery positioned inside housing 28 of accessory 10. In accordance with the invention, assembly 26 illuminates light substantially throughout a cone-shaped volume whose axis of symmetry is substantially coincident with the bottom surface of housing 28. In accordance with the invention, when accessory 10 is mounted on a helmet 32 as illustrated in FIG. 9, the axis 34 of the cone-shaped volume, throughout which light is being emitted, is substantially parallel to the road while the user is riding a motorcycle and wearing helmet 32.

In accordance with the invention, such orientation is selected because it enables the user to put things which he wishes to look at, such as a map, directly in front of the user's eyes and helmet, thus allowing the user to simultaneously and continuously observe the road and providing for a safer level of operation of the motorcycle. In this respect, the inventive accessory has the advantage of allowing hands-free control of the direction of orientation of light-emitting assembly 26.

In accordance with the invention, it is contemplated that wireless intercom portion 12 of accessory 10 may be removed from clip 14, to allow the same to be used as a freestanding flashlight or communication device. While such operation is not a hands-free operation, the orientation of accessory 10 and its associated light-emitting assembly 26 by hand has numerous advantages. Providing for the removable nature of intercom portion 12 provides added function and flexibility to accessory 10.

The removable nature is achieved by accessory 10 comprising separate portions, namely intercom 12 and clip 14. Intercom 12 snaps into clip 14, for example in the manner illustrated in connection with the following description of FIGS. 3-7.

More particularly, clip 14 comprises an inner tongue 36 which, during use, is positioned within helmet 32. Inner tongue 36 can be secured, by a pair of bolts 38 which pass through holes 40 in the base 42 of tongue 36, and into tapped holes 44 in housing engaging clamp 46. Housing engaging clamp 46 is positioned on the outside of helmet 32 during use. Secure engagement is provided by a frictional member 48 such as rubber which is glued, attached, or otherwise incorporated on the inner side of housing engaging clamp 46. Frictional member 48, during use, bears against the outside of helmet 32.

Housing engaging clamp 46 comprises an upper clamp member 50 which supports an upper stud 52. Similarly, housing engaging clamp 46 comprises a lower clamp member 54 which supports a lower stud 56. See FIGS. 5-6. As can be seen in FIG. 3, lower stud 56 is positioned in and mates with lower stud receiving notch 58 when intercom 12 is snapped into clip 14, as illustrated in FIG. 9. More particularly, accessory 10 comprises separate portions, namely clip 14 and intercom portion 12. Likewise, upper stud 52, when intercom 12 is snapped into clip 14, is positioned within, mates with and is securely held by an upper stud receiving notch 60.

Optionally, intercom 12 may include a plurality of light emitting diodes 62 (illustrated in phantom lines in FIG. 2) positioned behind a clear plastic lens member 64. This plurality of light emitting diodes are visible from the front of the device and from the rear, improving the visibility of the rider.

The use of inventive accessory 10 is implemented by placing the inner tongue 36 inside a helmet 32 and attaching the housing engagement clamp 46 with the frictional member 48 against the outside of helmet, securing the inner tongue 36 to the engagement clamp 46 using bolts or other means of attachment. The bolts are tightened to ensure a positive grip that will not release during use of the inventive accessory 10, for example by a rider on a motorcycle. Next, intercom 12 is stepped into clip 14 with the movement illustrated in FIG. 6 or by engaging the lower stud receiving notch 58 with lower stud 56 then upper stud receiving notch 60 with upper stud 52, or in reverse order, resulting in the inventive accessory 10 taking the configuration illustrated in FIG. 1.

While illustrative embodiments of the invention have been described, it is noted that various modifications will be apparent to those of ordinary skill in the art in view of the above description and drawings. Such modifications are within the scope of the invention which is limited and defined only by the following claims.

What is claimed:

1. A vehicle helmet, comprising:
   a helmet portion and
   a communications accessory securable to said vehicle helmet, wherein said vehicle helmet portion comprises a substantially continuous wall adapted to extend around the head of a user, said substantially continuous wall comprising right and left sidewall portions, a front wall portion and a rear wall portion, and said helmet wall portions each having a respective inside surface and a respective outside surface, said accessory comprising:
   (a) a housing;
   (b) a clip adapted to be secured to one of said sidewall portions of said a helmet, said clip comprising:
      i) a resilient tongue member for engaging the inside surface of the helmet,
      ii) a clamp member for frictionally engaging the outside of the helmet, wherein the clamp member comprises a frictional member comprising a rubber-like material, said frictional member configured, positioned and dimensioned to bear against the outside surface of the helmet, said frictional member including a forward frictional portion and a rearward frictional portion, said forward frictional portion and said rearward frictional portion defining a space therebetween, and said forward and rearward frictional portions having a thickness, said resilient tongue member mounted at a position on said clip where it is springingly urged toward the space between said forward and rearward frictional portions, said space being defined by the thickness of the forward and rearward frictional portions whereby the helmet is engaged by said forward and rearward frictional portions at two different points, said points being separated from each other and said clip is secured against rotation by the frictional engagement at said forward and rearward frictional portions; and
      iii) a securement member for securing said tongue member to said clamp member;
   (c) an engagement member positioned on said clamp member;
   (d) a mating engagement member positioned on said housing to snappingly engage and secure said housing to said clip, whereby said housing may be secured to the helmet;
   (e) a wireless communication system, having an audio input and an audio output, said wireless communication system being secured to said housing, said wireless communication system being configured to connect to the audio system in a smart phone;
   (f) a first connective system for connecting said audio output to a sound producing member located on said helmet;
   (g) a second connective system for connecting said audio input to a microphone located on said helmet; and
   (h) a light-emitting device emitting light positioned within said housing, said housing with said light-emitting device being positionable to direct light forward from said helmet when said housing is secured to said helmet, whereby objects may be viewed by an individual while the area in front of the user is also visible to the user.

2. Apparatus as in claim 1, wherein the first and second connective systems are electrical connectors, comprising a pair of cables with respective connectors associated with the helmet, said respective connectors mating with a pair of mating connector receiving electrical connectors mounted on said housing.

3. A communications accessory system for deployment on a plurality of helmets, said system comprising at least two communications accessories as in claim 1 utilized by at least two users, creating at least a two way communication.

4. A communications accessory system as in claim 3, wherein each of said communications accessories further comprises:
   (i) electronic circuitry coupled to said wireless communication system, said wireless communication system being further configured to communicate directly with other similarly configured communications accessories, whereby the wireless communications system provides a wireless intercom function;
   (j) first and second electrical button switches, said electrical button switches being coupled to said electronic circuitry, said electronic circuitry being configured to make a command input determination by sensing whether an actuated electrical button switch is closed for a short period of time, or for a relatively long period of time, and wherein the electronic circuitry is configured to perform different commands in response to different command input determinations to control the operation of said wireless communication and other functionalities.

5. A communications accessory system as in claim 1, wherein said clamp member defines a socket and said engagement member defines a plug configured and dimensioned to mate with said plug, wherein the securement member can be tightened to secure said tongue member to said clamp member.

6. A communications accessory system as in claim 1, wherein the engagement member further comprises an upper and lower stud, and the mating engagement member further comprising an upper and lower notch, wherein the upper and lower studs engage with the upper and lower notch, respectively.

7. A communications accessory system as in claim 1, wherein the light-emitting device comprises a plurality of light emitting diodes positioned behind a lens member, said lens member positioned within said housing.

8. A communications accessory system as in claim 7, wherein the light emitting diodes emit light visible from the rear of the light emitting device, improving visibility of the user.

9. A communications accessory system for deployment on a plurality of helmets, said helmets each comprising a substantially continuous wall adapted to extend around the head of a user, said substantially continuous wall comprising right and left sidewall portions, a front wall portion and a rearwall portion, and said helmet wall portions each having a respective inside surface and a respective outside surface, said system comprising a plurality of communications accessories for attachment to respective vehicle helmets, each of said communications accessories comprising:
(a) a chassis;
(b) a clamp adapted to be secured to a helmet via a resilient tongue member and a frictional member; said frictional member including a forward frictional portion and a rearward frictional portion, said forward frictional portion and said rearward frictional portion defining a space therebetween, and said forward and rearward frictional portions having a thickness, said resilient tongue member mounted at a position on said clamp where it is springingly urged toward the space between said forward and rearward frictional portions, said space being defined by the thickness of the forward and rearward frictional portions whereby the helmet is engaged by said forward and rearward frictional portions at two different points, said points being separated from each other and said clamp is secured against rotation by the frictional engagement at said forward and rearward frictional portions
(c) an engagement member positioned on said clamp;
(d) a mating engagement member positioned on said chassis to secure said chassis to said clamp, whereby said communications accessory may be secured to a respective helmet on at least one of said sidewall portions;
(e) a wireless communications system, having an audio input and an audio output, said wireless communications system being secured to said chassis, said wireless communications system being configured to connect to the audio system in a smart phone, said wireless communications system being further configured to communicate directly with other similarly configured communications accessories, whereby the wireless communications system provides a wireless intercom function;
(f) a first connection member for connecting said audio output to a sound producing member located on said helmet;
(g) a second connection member for connecting said audio input to a microphone located on said helmet;
(h) electronic circuitry coupled to said wireless communications system; and
(i) first and second electrical button switches, said electrical button switches being coupled to said electronic circuitry, said electronic circuitry being configured to make a command input determination by sensing whether an actuated electrical button switch is closed for a short period of time, and/or for a relatively long period of time, and or two electrical button switches are pushed simultaneously, and wherein the electronic circuitry is configured to perform different commands in response to different command input determinations to control the operation of said wireless communications accessory and other functionalities.

10. A communications accessory system for deployment on a plurality of helmets as in claim 9, wherein said functionalities consist of one or more functionalities in the group consisting of said intercom function, and turning the accessory on and off.

11. A communications accessory system as in claim 9, wherein each of said communications accessories further comprises:
(j) a light-emitting device emitting light positioned on said chassis, said chassis with said light-emitting device being positionable to direct light forward from said helmet when said chassis is secured to said helmet, whereby objects may be viewed by an individual while the area in front of the user is also visible to the user, and wherein said functionalities consist of one or more functionalities in the group consisting of said intercom function, turning said light emitting device on and off, and turning the accessory on and off, communicating between rider-to-rider or rider-to-passenger, intercom talk hands free, listening to music, listening to voice instructions from GPS navigation, and noise cancelation.

12. A communications accessory system as in claim 9, wherein each of said communications accessories further comprises a rotary knob configured to control the volume on said wireless communications system.

13. A communications accessory system as in claim 12, wherein each of said communications accessories further comprises a third electrical button switch with an actuating surface positioned proximate the center of said rotary knob, said third electrical button switch being coupled to said electronic circuitry, said third electrical button switch being configured to, together with said first and second electrical button switches, control the operation of the functionalities of said wireless communications accessory.

14. A communications accessory system as in claim 13, wherein said electronic circuitry is configured to make a command input determination by sensing which, if any, of the first, second and third electrical button switches is closed for a short period of time, or for a relatively long period of time, and wherein the electronic circuitry is further configured to perform different commands in response to different command input determinations to control the operation of said wireless communications accessory functionalities.

15. A communications accessory system as in claim 13, wherein said first and second electrical button switches are positioned one above the other, and said third electrical button switch is positioned to the side of said first and second electrical button switches.

16. A communications accessory system as in claim 15, wherein said clamp comprises:
i) a first jaw member for engaging an inside surface of a helmet within said helmet,
ii) a second jaw member for engaging an outside surface of a helmet, and
iii) at least one bolt securing said first jaw member to said second jaw member.

17. A communications accessory system as in claim 13, wherein said first and second electrical button switches are positioned one above the other and horizontally offset with respect to each other, and said third electrical button switch is positioned to the side of said first and second electrical button switches.

18. A communications accessory system as in claim 9, wherein said clamp comprises:
i) a first jaw member for engaging an inside surface of a helmet, and
ii) a second jaw member for engaging an outside surface of a helmet, and
iii) at least one bolt securing said first jaw member to said second jaw member.

19. A communications accessory system as in claim 9, wherein each of said communications accessories further comprises a rotary knob configured to control the volume on said wireless communications system, wherein each of said communications accessories further comprises a third electrical button switch positioned proximate the center of said rotary knob, said third electrical button switch being coupled to said electronic circuitry, said third electrical button switch being configured to, together with said first and second electrical button switches, control the operation of the functionalities of said wireless communications accessory, wherein said first and second electrical button switches are positioned one above the other and horizontally offset with respect to each other, wherein said third electrical button switch is positioned to the side of said first and second electrical button switches, and wherein said electronic circuitry is controlled by manual controls consisting of said first, second and third electrical button switches and said rotary knob.

20. A communications accessory system as in claim 19, wherein said third electrical button switch is activated by pushing said rotary knob.

\* \* \* \* \*